US012027160B2

(12) United States Patent
Kracun et al.

(10) Patent No.: US 12,027,160 B2
(45) Date of Patent: Jul. 2, 2024

(54) USER MEDIATION FOR HOTWORD/KEYWORD DETECTION

(71) Applicant: GOOGLE LLC, Mountain View, CA (US)

(72) Inventors: Aleks Kracun, New York, NY (US); Niranjan Subrahmanya, Jersey City, NJ (US); Aishanee Shah, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/074,691

(22) Filed: Dec. 5, 2022

(65) Prior Publication Data

US 2023/0101572 A1    Mar. 30, 2023

Related U.S. Application Data

(63) Continuation of application No. 17/011,612, filed on Sep. 3, 2020, now Pat. No. 11,521,604.

(51) Int. Cl.
*G10L 15/22* (2006.01)
*G10L 15/06* (2013.01)
(Continued)

(52) U.S. Cl.
CPC .......... *G10L 15/197* (2013.01); *G10L 15/063* (2013.01); *G10L 15/22* (2013.01); *G10L 2015/088* (2013.01); *G10L 2015/223* (2013.01)

(58) Field of Classification Search
CPC ..... G10L 15/197; G10L 15/063; G10L 15/22; G10L 2015/088; G10L 2015/223
(Continued)

(56) References Cited

U.S. PATENT DOCUMENTS

| 10,002,613 | B2 * | 6/2018 | Rubin | ..................... G10L 25/51 |
| 2009/0215503 | A1 * | 8/2009 | Zhang | ................. H04M 1/6505 |
| | | | | 455/569.1 |

(Continued)

FOREIGN PATENT DOCUMENTS

| EP | 1496499 | 1/2005 |
| JP | 2014137430 | 7/2014 |

(Continued)

OTHER PUBLICATIONS

D. O'Shaughnessy, "Interacting with computers by voice: automatic speech recognition and synthesis," in Proceedings of the IEEE, vol. 91, No. 9, pp. 1272-1305, Sep. 2003, doi: 10.1109/JPROC.2003. 817117. (Year: 2003) (Year: 2003) (Year: 2003).*

(Continued)

*Primary Examiner* — Bharatkumar S Shah
(74) *Attorney, Agent, or Firm* — Gray Ice Higdon

(57) ABSTRACT

Techniques are described herein for improving performance of machine learning model(s) and thresholds utilized in determining whether automated assistant function(s) are to be initiated. A method includes: receiving, via one or more microphones of a client device, audio data that captures a spoken utterance of a user; processing the audio data using a machine learning model to generate a predicted output that indicates a probability of one or more hotwords being present in the audio data; determining that the predicted output satisfies a secondary threshold that is less indicative of the one or more hotwords being present in the audio data than is a primary threshold; in response to determining that the predicted output satisfies the secondary threshold, prompting the user to indicate whether or not the spoken utterance includes a hotword; receiving, from the user, a response to the prompting; and adjusting the primary threshold based on the response.

20 Claims, 7 Drawing Sheets

(51) Int. Cl.
    *G10L 15/197* (2013.01)
    *G10L 15/08* (2006.01)
(58) Field of Classification Search
    USPC .......................................................... 704/243
    See application file for complete search history.

(56) References Cited

U.S. PATENT DOCUMENTS

| | | | |
|---|---|---|---|
| 2015/0332675 A1 | 11/2015 | Yasuda | |
| 2016/0077794 A1 | 3/2016 | Kim et al. | |
| 2016/0300575 A1 | 10/2016 | Foerster et al. | |
| 2020/0104706 A1 | 4/2020 | Sandler | |
| 2020/0143809 A1* | 5/2020 | Lee | G10L 15/22 |
| 2020/0184966 A1 | 6/2020 | Yavagal | |
| 2021/0360109 A1* | 11/2021 | Rico Ródenas | H04M 3/5235 |
| 2022/0068268 A1 | 3/2022 | Kracun et al. | |

FOREIGN PATENT DOCUMENTS

| | | | |
|---|---|---|---|
| JP | 2016505897 | 2/2016 | |
| WO | 2014107413 | 7/2014 | |
| WO | WO2021091573 A1 * | 5/2021 | G06F 3/167 |

OTHER PUBLICATIONS

Douglas O'Shaughnessy, "Automatic Speech Recognition," in Speech Communications: Human and Machine , IEEE, 2000, pp. 367-435, doi: 10.1109/9780470546475.ch10. (Year: 2000) (Year: 2000) (Year: 2000) (Year: 2000) (Year: 2000).*

Technical Disclosure of Dynamic adjustment of hotword detection threshold by Authors et al.: Disclosed Anonymously IP.com No. IPCOM000257597D IP.com Electronic Publication Date: Feb. 22, 2019 (Year: 2019) (Year: 2019) (Year: 2019) (Year: 2019) (Year: 2019).*

J.H. L. Hansen and T. Hasan, "Speaker Recognition by Machines and Humans: A tutorial review," in IEEE Signal Processing Magazine, vol. 32, No. 6, pp. 74-99, Nov. 2015, doi: 10.1109/MSP.2015.2462851. (Year: 2015) (Year: 2015).*

Australia Patent Office; Examiner Report No. 1 issued in Application No. 2020466345; 4 pages; dated May 17, 2023.

O'Shaughnessy, D .; "Interacting with computers by voice: automatic speech recognition and synthesis"; in Proceedings of the IEEE; vol. 91, No. 9; pp. 1272-1305; dated Sep. 2003.

Authors et al.; Technical Disclosure of Dynamic adjustment of hotword detection threshold; Disclosed Anonymously IP.com No. IPCOM000257597D IP.com Electronic Publication Date: Feb. 22, 2019.

Leroy, D. et al., "Federated Learning for Keyword Spotting;" 2019 IEEE International Conference on Acoustics, Speech and Signal Processing (ICASSP); pp. 6341-6345; May 12, 2019.

European Patent Office; International Search Report and Written Opinion of Ser. No. PCT/US2020/065053; 14 pages; dated May 14, 2021.

Wadhwa, et al.; Dynamic Adjustment of Hotword Detection Threshold; Technical Disclosure Commons 7 pages; dated Feb. 13, 2019.

Hey Siri: An On-device DNN-powered Voice Trigger for Apple's Personal Assistant; Apple Machine Learning Research. Oct. 2017. Retreived from https://machinelearning.apple.com/research/hey-siri [Accessed Sep. 3, 2020] 11 pages. Oct. 2017.

O'Shaughnessy, D, "Automatic Speech Recognition," in Speech Communications: Human and Machine, IEEE, 2000, pp. 367-435, doi: 10.1109/9780470546475.ch10, dated 2000.

Australia Patent Office; Examination Report issued for Application No. 2020466345, 3 pages, dated Sep. 20, 2023.

Australia Patent Office; Notice of Acceptance issued for Application No. 2020466345, 8 pages, dated Oct. 24, 2023.

Intellectual Property India; Examination Report issued in Application No. 202227057520; 7 pages; dated Dec. 8, 2023.

Japanese Patent Office; Notice of Reasons of Rejection issued in Application No. 2022-564432; 8 pages; dated Jan. 9, 2024.

* cited by examiner

USER MEDIATION FOR HOTWORD/KEYWORD DETECTION

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant," "OK Assistant," and/or "Assistant." When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when predicted output indicates that a hotword is not present, corresponding audio data will be discarded without any further processing, thereby conserving resources and user privacy.

Some automated assistants additionally or alternatively implement a continued conversation mode that can be enabled. When enabled, the continued conversation mode can process any spoken input that is detected via microphone(s) of a client device within a threshold amount of time of a prior spoken utterance directed to the automated assistant and/or within a threshold amount of time after the automated assistant has performed action(s) based on the prior spoken utterance. For example, a user can initially invoke the automated assistant (e.g., via hotword, a hardware or software button, etc.) and provided an initial utterance of "turn on living room lights", then shortly after provide a follow-on utterance of "turn on the kitchen lights". The follow-on utterance will be acted upon by the automated assistant when continued conversation mode is enabled, without necessitating the user again invoke the assistant.

Continued conversation mode can discriminate between follow-on utterances of a user that are intended for processing by the automated assistant and utterance(s) that are not so intended (e.g., utterances that are instead directed to another human). In doing so, audio data capturing the follow-up utterance can be processed using a machine learning model, optionally along with recognized text from the follow-up utterance and/or representation(s) thereof (e.g., natural language understanding data generated based on the recognized text). Predicted output is generated based on the processing, and indicates whether the follow-up utterance is intended for the automated assistant. Further automated assistant function(s) are activated only when the predicted output indicates the follow-up utterance is intended for the automated assistant. Otherwise, the further automated assistant function(s) are not activated, and data corresponding to the follow-up utterance is discarded. The further function(s) can include, for example, further verification that the follow-up utterance is intended for the automated assistant and/or performing action(s) based on the follow-up utterance.

The above-mentioned and/or other machine learning models (e.g., additional machine learning models described below), whose predicted output dictates whether automated assistant function(s) are activated, perform well in many situations. However, there are still occurrences of false negative determinations and false positive determinations based on the machine learning model(s).

With a false negative, the predicted output dictates that the automated assistant function(s) not be activated, despite the audio data (and/or other data), processed to generate the predicted output, being appropriate for activating those function(s). For example, assume the predicted output generated using a hotword detection model is a probability and the probability must be greater than 0.85 before the automated assistant function(s) are activated. If a spoken utterance indeed includes the hotword, but the predicted output generated based on processing audio data is only 0.82, the function(s) will not be activated and this will be considered a false negative. Occurrences of false negatives can prolong the human/automated assistant interaction, forcing the human to repeat the utterance (and/or perform other action(s)) that were initially intended to activate automated assistant functions.

With a false positive, the predicted output dictates that the automated assistant function(s) be activated, despite the audio data (and/or other sensor data), processed to generate the predicted output, being inappropriate for activating those function(s). For example, assume the predicted output generated using a hotword detection model is a probability and the probability must be greater than 0.85 before the automated assistant function(s) are activated. If a spoken utterance does not include the hotword, but the predicted output generated based on processing audio data is 0.86, the function(s) will still be activated and this will be considered a false positive. In addition to privacy concerns, occurrences of false positives can waste network and/or computational resources by needlessly activating the function(s).

SUMMARY

Some implementations disclosed herein are directed to improving performance of machine learning model(s) through automatic adjustment of thresholds that are utilized in determining whether automated assistant function(s) are to be initiated. As described in more detail herein, such machine learning models can include, for example, hotword detection models and/or other machine learning models. Various implementations generate, at a client device, a predicted output based on processing audio data and/or other sensor data using a machine learning model stored locally at the client device. Those implementations further make a decision, based on the predicted output, as to whether to initiate one or more automated assistant function(s). For example, the decision can be based on whether the predicted output satisfies a threshold. Further, those implementations determine, locally at the client device and based on analyzing further user interface input and/or other data, whether the decision, made based on the predicted output, was correct. When it is determined that the decision was incorrect (i.e., the decision was a false negative or a false positive), those implementations automatically adjust the threshold.

In some implementations, the automatically adjusted threshold may persist and be used for one or more subsequent decisions as to whether to initiate one or more automated assistant function(s). For example, the automatically adjusted threshold may be used until a decision is made to further adjust the automatically adjusted threshold (e.g., in response to a false negative or a false positive) in accordance with one or more of the methods described herein. In some implementations, the automatically adjusted threshold may be dynamically adjusted over time to adapt for users and/or environmental conditions (e.g., introduction or removal of a noisemaker or other background noise). This can improve performance by reducing the occurrence of false negatives and/or false positives based on predicted outputs and the resulting computational resources that are wasted in response.

In an example, the threshold may be automatically lowered when a user begins using a noisy appliance such as a fan during summer months (e.g., in response to one or more false negatives that occur after the user begins using the noisy appliance). The process of automatically adjusting the threshold may be an iterative process in which the threshold is fine-tuned through repeated adjustments based on false positives and/or false negatives. In the example, the threshold may be automatically lowered multiple times based on multiple false negatives after the user begins using the noisy appliance, and then automatically raised based on a false positive after the threshold has been lowered multiple times. The automatically adjusted threshold may persist until further adjustments are determined based on false positives and/or false negatives. When the user discontinues use of the noisy appliance (e.g., at the end of the summer), the threshold may be automatically raised (e.g., in response to one or more false positives that occur after the user discontinues use of the noisy appliance).

Various implementations described herein are described with respect to a hotword detection model that is trained to detect assistant invocation hotword(s) such as "OK Computer", "Hey Computer", and/or other invocation hotword(s). In some of those implementations, when any of the corresponding hotword(s) is detected, speech recognition can be activated for processing any spoken word(s) that follow the hotword. In addition to or instead of adjusting threshold(s) for a hotword detection model that is trained to detect assistant invocation hotword(s), some implementations can adjust threshold(s) for hotword detection model(s) that are trained to detect hotword(s) beyond invocation hotword(s) and that are at least selectively activated. In some of those implementations, when any of the corresponding hotword(s) of such a model is detected, a corresponding action can be performed, optionally without performing any speech recognition. As one example, a hotword model can be trained to detect "stop" and/or "halt" and can be activated at a client device at least when certain audio is being rendered at the client device, such as a timer alarm being rendered. In response to detecting "stop" and/or "halt", the corresponding action of halting rendering of the certain audio can be performed.

In some implementations, when it is determined that the decision was incorrect, a gradient is generated locally at the client device based on comparing the predicted output to ground truth output (e.g., ground truth output that satisfies the threshold). In some implementations, the generated gradient is used, by one or more processor(s) of the client device, to update one or more weights of the machine learning model based on the generated gradient. For example, backpropagation and/or other technique(s) can be used to update the weights based on the gradient. This can improve performance of the machine learning model stored locally at the client device, mitigating the occurrence of false negatives and/or false positives based on predicted outputs generated using the machine learning model. Moreover, this enables improved performance of the on-device machine learning model for attribute(s) of user(s) of the client device, such as tone, intonation, accent, and/or other speech characteristic(s) in the case of machine learning model(s) that process audio data capturing spoken utterances.

In some implementations, the generated gradient is additionally or alternatively transmitted, by the client device and over a network, to a remote system. In those implementations, the remote system utilizes the generated gradient, and additional gradients from additional client devices, to update global weights of a corresponding global machine learning model using federated learning techniques. The additional gradients from the additional client devices can be similarly generated, locally at the corresponding additional client devices, based on determining that corresponding decisions were incorrect. In various implementations, the client device transmits the generated gradient without transmitting any of the data (e.g., audio data and/or other sensor data) that was utilized to generate the predicted output that was determined to be incorrect, and without transmitting any of the data (e.g., further user interface input) that was utilized to determine the predicted output was incorrect. The remote system can utilize the generated gradient in updating the global model using federated learning techniques, without any reference to or use of such data. The transmitting of only the gradient utilizes less network resources than transmitting of the larger data size data used to generate the predicted output and to determine that the predicted output was incorrect. Further, transmitting of the gradient preserves privacy and security of personal data, as the data utilized in generating the predicted output and in determining that the predicted output was incorrect, is not derivable from the gradient. In some implementations, one or more differential privacy techniques (e.g., adding Gaussian noise) can be utilized to further ensure such data is not derivable from the gradient.

In implementations where the remote system updates global weights of the speech recognition model, the remote system can thereafter provide the updated global weights to client devices to cause the client devices to replace weights of their on-device machine learning models with the updated global weights. In some implementations, the remote system can additionally or alternatively provide the updated machine learning model to client devices to cause the client devices to replace their on-device machine learning models with the updated global machine learning model. On-device performance is therefore improved through utilization of the updated global weights or updated global machine learning model.

Various techniques can be utilized to determine that a decision, as to whether to initiate currently dormant automated assistant function(s), is incorrect. In some implementations, determining that the decision is incorrect can be based on further user interface input that is received at the client device subsequent to the sensor data utilized to make the decision. For example, a user may indicate whether or not a spoken utterance included a hotword, either in response to a prompt or without being prompted. In other implementations, determining that the decision is incorrect can be based on further user interface input that is received at the client device subsequent to the sensor data utilized to make the decision, and that contradicts (explicitly or implicitly) the decision. In those implementations, determining that the decision is incorrect can be based on a duration of time between receiving the sensor data utilized to make the decision and receiving the further user interface input. For example, a likelihood of determining that the decision was incorrect can increase as the duration of time decreases and/or determining that the decision was incorrect can be contingent on the duration being less than a threshold. In those implementations, determining that the decision is incorrect can additionally or alternatively be based on a determined measure of similarity between the further user interface input and the sensor data utilized to make the decision (with a likelihood of determining that the decision was incorrect increasing with increasing similarity indicated by the measure of similarity). For example, the measure of similarity can be based on duration similarity based on comparison of durations of the further user interface input and the sensor data utilized to make the determination. Also, for example, when the further user interface input is an additional spoken utterance and the sensor data utilized to make the determination includes a prior spoken utterance, the measure of similarity can be based on voice similarity based on comparison of voice characteristics of the spoken utterance and the additional spoken utterance and/or text similarity based on comparison of recognized text of the spoken utterance and the additional spoken utterance.

In various implementations, a method implemented by one or more processors may include receiving, via one or more microphones of a client device, audio data that captures a spoken utterance of a user; processing the audio data using a machine learning model to generate a predicted output that indicates a probability of one or more hotwords being present in the audio data; determining that the predicted output satisfies a secondary threshold that is less indicative of the one or more hotwords being present in the audio data than is a primary threshold; in response to determining that the predicted output satisfies the secondary threshold, prompting the user to indicate whether or not the spoken utterance includes a hotword; receiving, from the user, a response to the prompting; and adjusting the primary threshold based on the response.

In some implementations, an automated assistant function may be initiated in response to the predicted output satisfying the primary threshold. In some implementations, the machine learning model may be a hotword detection model, and federated learning may be used to train the hotword detection model based on the response.

In some implementations, the predicted output fails to satisfy the primary threshold; the response indicates that the spoken utterance includes the hotword; and the adjusting the primary threshold based on the response includes lowering the primary threshold. In some implementations, the predicted output satisfies the primary threshold; the response indicates that the spoken utterance does not include the hotword; and the adjusting the primary threshold based on the response includes raising the primary threshold.

In some implementations, the prompting is further in response to determining that a number of times that the user has been previously prompted does not exceed a rate limit. In some implementations, the prompting is further in response to determining that a do not disturb state is disabled. In some implementations, the prompting is further in response to determining that the user has not accessed the client device during a predetermined period of time.

In some additional or alternative implementations, a computer program product may include one or more computer-readable storage media having program instructions collectively stored on the one or more computer-readable storage media. The program instructions may be executable to: receive, via one or more microphones of a client device, audio data that captures a spoken utterance of a user; process the audio data using a machine learning model to generate a predicted output that indicates a probability of one or more hotwords being present in the audio data; determine that the predicted output satisfies a threshold; receive, from the user, an indication that the spoken utterance does not include a hotword; and in response to determining that the predicted output satisfies the threshold and receiving the indication that the spoken utterance does not include the hotword, adjust the threshold.

In some implementations, the program instructions are further executable to initiate an automated assistant function, in response to determining that the predicted output satisfies the threshold and prior to receiving the indication that the spoken utterance does not include the hotword. In some implementations, the machine learning model is a hotword detection model, and the program instructions are further executable to train the hotword detection model based on the indication that the spoken utterance does not include the hotword.

In some implementations, the adjusting the threshold includes raising the threshold. In some implementations, the program instructions are further executable to prompt the user to indicate whether or not the spoken utterance includes the hotword, and the indication that the spoken utterance does not include the hotword is received as a response to the prompting.

In some additional or alternative implementations, a system may include a processor, a computer-readable memory, one or more computer-readable storage media, and program instructions collectively stored on the one or more computer-readable storage media. The program instructions may be executable to: receive, via one or more microphones of a client device, first audio data that captures a first spoken utterance of a user; process the first audio data using a machine learning model to generate a first predicted output that indicates a probability of one or more hotwords being present in the first audio data; determine that the first predicted output does not satisfy a threshold; in response to determining that the first predicted output does not satisfy the threshold, make a first adjustment to the threshold; subsequent to making the first adjustment: receive, via the one or more microphones of the client device, second audio data that captures a second spoken utterance of the user; process the second audio data using the machine learning model to generate a second predicted output that indicates a probability of the one or more hotwords being present in the second audio data; determine that the second predicted output does not satisfy the threshold that is adjusted according to the first adjustment; and in response to determining that the second predicted output does not satisfy the threshold that is adjusted according to the first adjustment, make a second adjustment to the threshold.

In some implementations, the making the first adjustment to the threshold includes lowering the threshold and is further in response to receiving, from the user, an indication that the first spoken utterance includes a hotword; and the making the second adjustment to the threshold includes further lowering the threshold and is further in response to receiving, from the user, an indication that the second spoken utterance includes the hotword.

In some implementations, the program instructions are further executable to: receive, via the one or more microphones of the client device, third audio data that captures a third spoken utterance of the user; process the third audio data using the machine learning model to generate a third predicted output that indicates a probability of the one or more hotwords being present in the third audio data; determine that the third predicted output satisfies the threshold that is adjusted according to the first adjustment and the second adjustment; and in response to determining that the third predicted output satisfies the threshold that is adjusted according to the first adjustment and the second adjustment, make a third adjustment to the threshold.

In some implementations, the making the third adjustment to the threshold includes raising the threshold and is further in response to receiving, from the user, an indication that the third spoken utterance does not include the hotword.

Through utilization of one or more techniques described herein, occurrences of false negatives and/or false positives, based on audio data corresponding to spoken utterance(s) and/or sensor data corresponding to utterance free physical movement(s), can be identified and labeled, locally at a corresponding client device. Further, thresholds can be adjusted using the identified and labeled false positive(s) and negative(s). Additionally, gradients can optionally be generated using the identified and labeled false positive(s) and negative(s), locally at a corresponding client device. The gradients can be utilized, locally at a corresponding client device, to update a corresponding locally stored machine learning model and/or can be transmitted to a remote system for use in updating a corresponding global model. This results in improved performance of corresponding locally stored machine learning models and/or the corresponding global model (which can be transmitted to various client devices for use). Additionally or alternatively, the labelling of false positives and/or false negatives, locally at corresponding client devices, can maintain privacy of user data (e.g., spoken utterances, etc.) as such user data may never be transmitted from the corresponding client devices.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s))) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
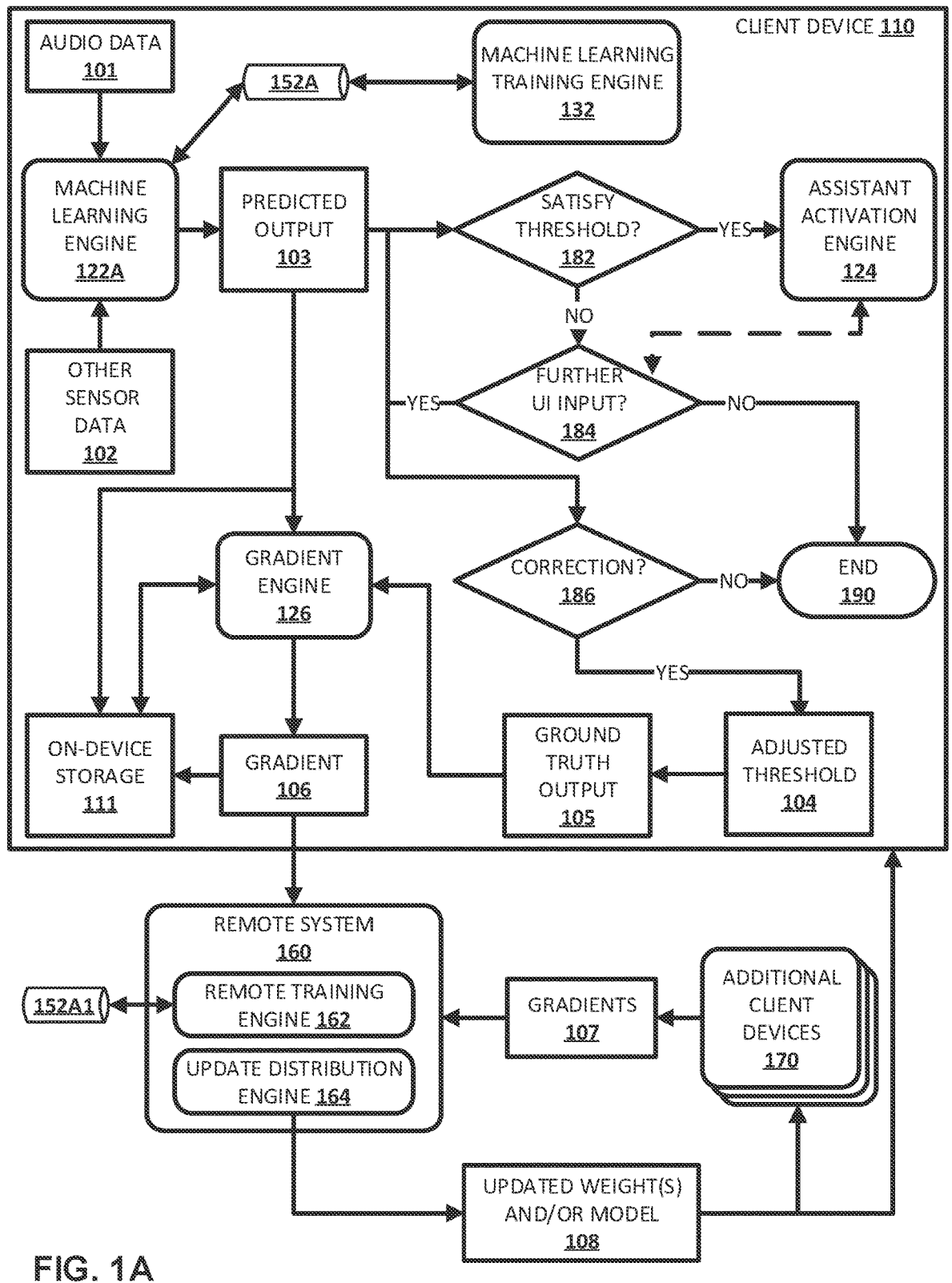
FIGS. 1A and 1B depict example process flows that demonstrates various aspects of the present disclosure, in accordance with various implementations.
Figure 1B:
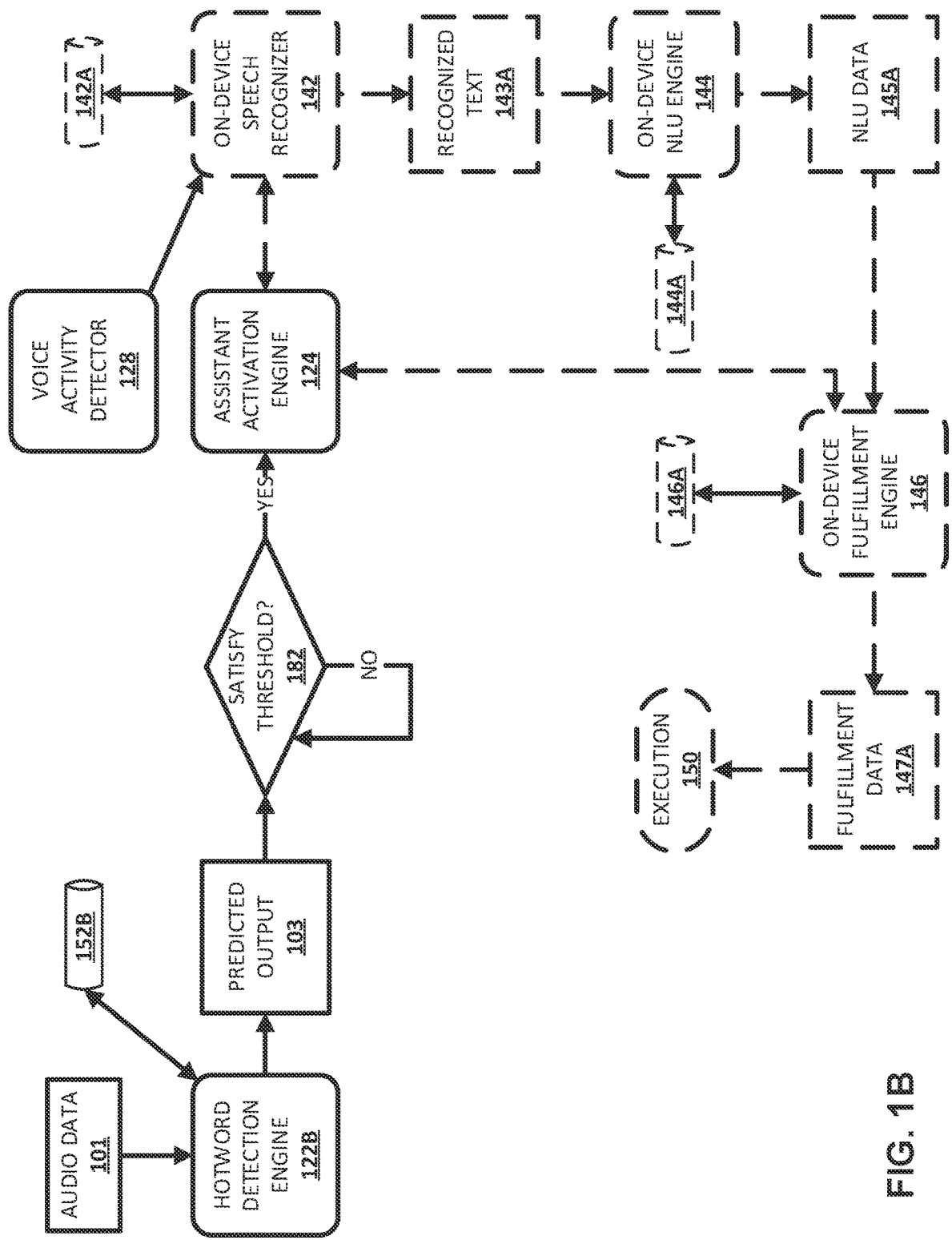

FIGS. 1A and 1B depict example process flows that demonstrates various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating a gradient 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output 103 is a probability (e.g., 0.80 or 0.90) and the threshold at block 182 is a threshold probability (e.g., 0.85), if the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can stop identifying corrections and end at block 190.

However, if the client device 110 determines there is further user interface input received at block 184, then the system can determine whether the further user interface input received at block 184 includes correction(s) at block 186 that contradict the decision made at block 182 (e.g., user-mediated or user-provided corrections). The correction(s) can either identify a false negative (e.g., as described in more detail with respect to FIGS. 3 and 5) or a false positive (e.g., as described in more detail with respect to FIGS. 3 and 4). If the client device 110 determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine adjusted threshold 104 and ground truth output 105.

As one non-limiting example of a false negative, assume that the machine learning engine 122A is trained to generate a probability as the predicted output 103, that the client device 110 incorrectly determined the predicted output 103 (e.g., 0.80) fails to satisfy the threshold at block 182 (e.g., 0.85), and that the client device 110 refrained from initiating currently dormant automated assistant function(s) and/or shut down currently active automated assistant function(s). Further, assume that the client device 110 determined, based on the further user interface input received at block 184, that the further user interface input contradicts the initial decision made at block 182, and that the client device 110 should have initiated currently dormant automated assistant function(s) and/or refrained from shutting down currently active automated assistant function(s). In this instance, the adjusted threshold 104 can be a threshold that is lower than the threshold (e.g., 0.85) used at block 182. In implementations, as a non-limiting example, the adjusted threshold 104 can be determined based on the probability that was generated as the predicted output 103 (e.g., 0.80). In other implementations, as a non-limiting example, the adjusted threshold 104 can be determined by lowering the threshold used at block 182 by a predetermined amount (e.g., 0.85–0.03=0.82) or a predetermined percentage (e.g., 0.85 lowered by 5%=0.8075). Additionally, in this instance, the ground truth output 105 can also be a probability (e.g., 1.00) that indicates the client device 110 should have initiated currently dormant automated assistant function(s) and/or refrained from shutting down currently active automated assistant function(s).

As one non-limiting example of a false positive, assume that the machine learning engine 122A is trained to generate a probability as the predicted output 103, that the client device 110 incorrectly determined the predicted output 103 (e.g., 0.90) satisfies the threshold at block 182 (e.g., 0.85), and that the client device 110 initiated currently dormant automated assistant function(s) and/or refrained from shutting down currently active automated assistant function(s). Further, assume that the client device 110 determined, based on the further user interface input received at block 184, that the further user interface input contradicts the initial decision made at block 182, and that the client device 110 should not have initiated currently dormant automated assistant function(s) and/or refrained from shutting down currently active automated assistant function(s). In this instance, the adjusted threshold 104 can be a threshold that is higher than the threshold (e.g., 0.85) used at block 182. In implementations, as a non-limiting example, the adjusted threshold 104 can be determined based on the probability that was generated as the predicted output 103 (e.g., 0.90). In other implementations, as a non-limiting example, the adjusted threshold 104 can be determined by raising the threshold used at block 182 by a predetermined amount (e.g., 0.85+0.03=0.88) or a predetermined percentage (e.g., 0.85 raised by 5%=0.8925). Additionally, In this instance, the ground truth output 105 can also be a probability (e.g., 0.00) that indicates the client device 110 should not have initiated currently dormant automated assistant function(s) and/or refrained from shutting down currently active automated assistant function(s). Although the predicted output 103, the threshold used at block 182, the adjusted threshold 104, and the ground truth output 105 are described herein as being probabilities, it should be understood that is not meant to be limiting and that the predicted output 103, the threshold used at block 182, the adjusted threshold 104, and the ground truth output 105 can be labels, annotations, binary values, and/or other likelihood measures.

In some implementations, if the client device 110 determines that the further user interface input received at block 184 includes a correction at block 186 that is a false negative, the assistant activation engine 124 of the client device 110 may activate a microphone of the client device 110 and initiate one or more currently dormant automated assistant functions as the user intended.

In some implementations, the gradient engine 126 can generate the gradient 106 based on the predicted output 103 to the ground truth output 105. For example, the gradient engine 126 can generate the gradient 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the predicted output 103 and the corresponding ground truth output 105 to generate the gradient 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradient 106 in real-time.

Moreover, the gradient engine 126 can provide the generated gradient 106 to on-device machine learning training engine 132A. The on-device machine learning training engine 132A, when it receives the gradient 106, uses the gradient 106 to update the on-device machine learning model 152A. For example, the on-device machine learning training engine 132A can utilize backpropagation and/or other techniques to update the on-device machine learning model 152A. It is noted that, in some implementations, the on-device machine learning training engine 132A can utilize batch techniques to update the on-device machine learning model 152A based on the gradient 106 and additional gradients determined locally at the client device 110 on the basis of additional corrections.

Further, the client device 110 can transmit the generated gradient 106 to a remote system 160. When the remote system 160 receives the gradient 106, a remote training engine 162 of the remote system 160 uses the gradient 106, and additional gradients 107 from additional client devices 170, to update global weights of a global speech recognition model 152A1. The additional gradients 107 from the additional client devices 170 can each be generated based on the same or similar technique as described above with respect to the gradient 106 (but on the basis of locally identified corrections that are particular to those client devices).

An update distribution engine 164 can, responsive to one or more conditions being satisfied, provide, to the client device 110 and/or other client device(s), the updated global weights and/or the updated global speech recognition model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights.

When the updated global speech recognition model is provided to the client device 110, the client device 110 can replace the on-device machine learning model 152A with the updated global speech recognition model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region and provided to client device 110 based on the client device 110 being primarily located in the particular geographic region.

Figure 2:
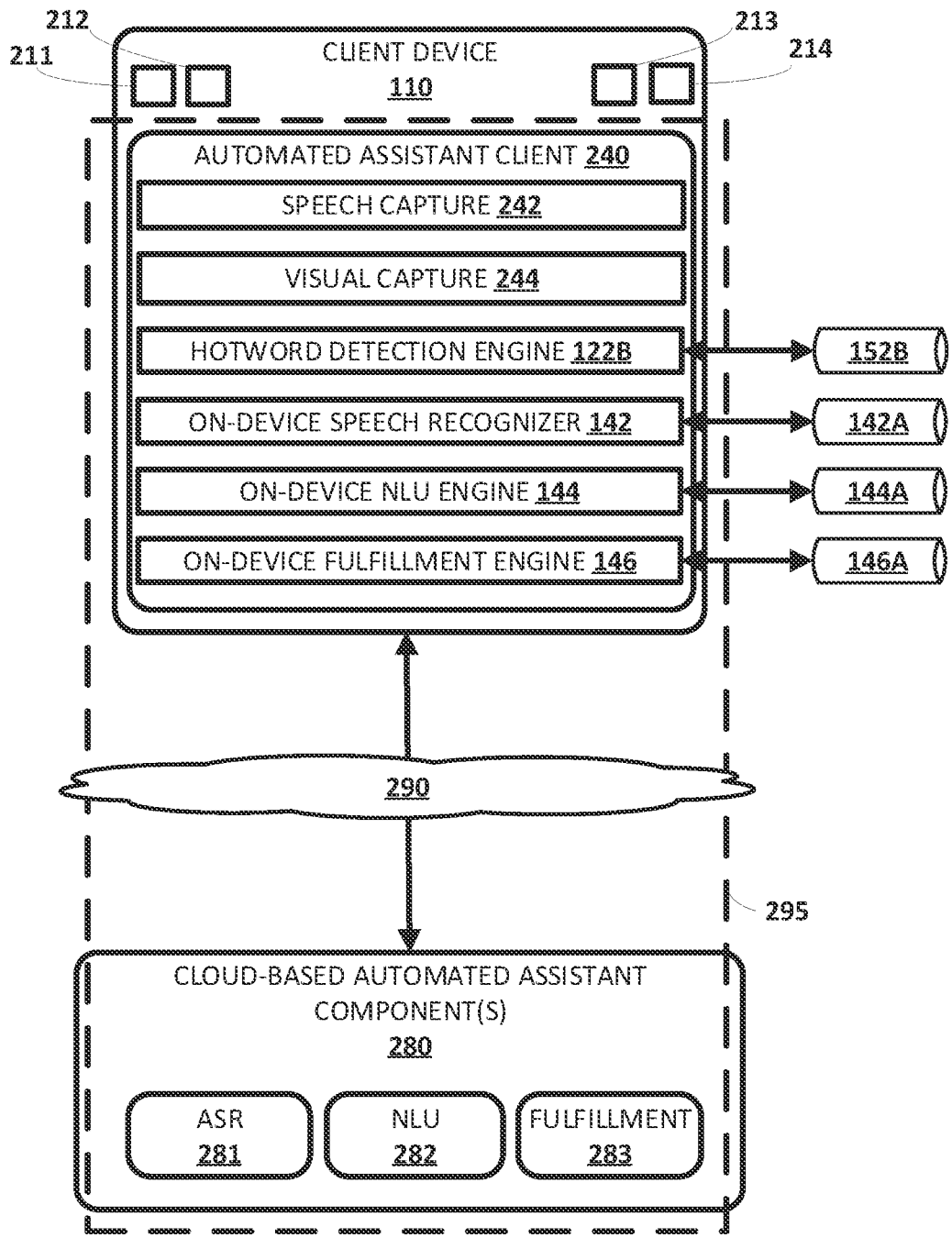
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) an automated assistant client 240. The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143B from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
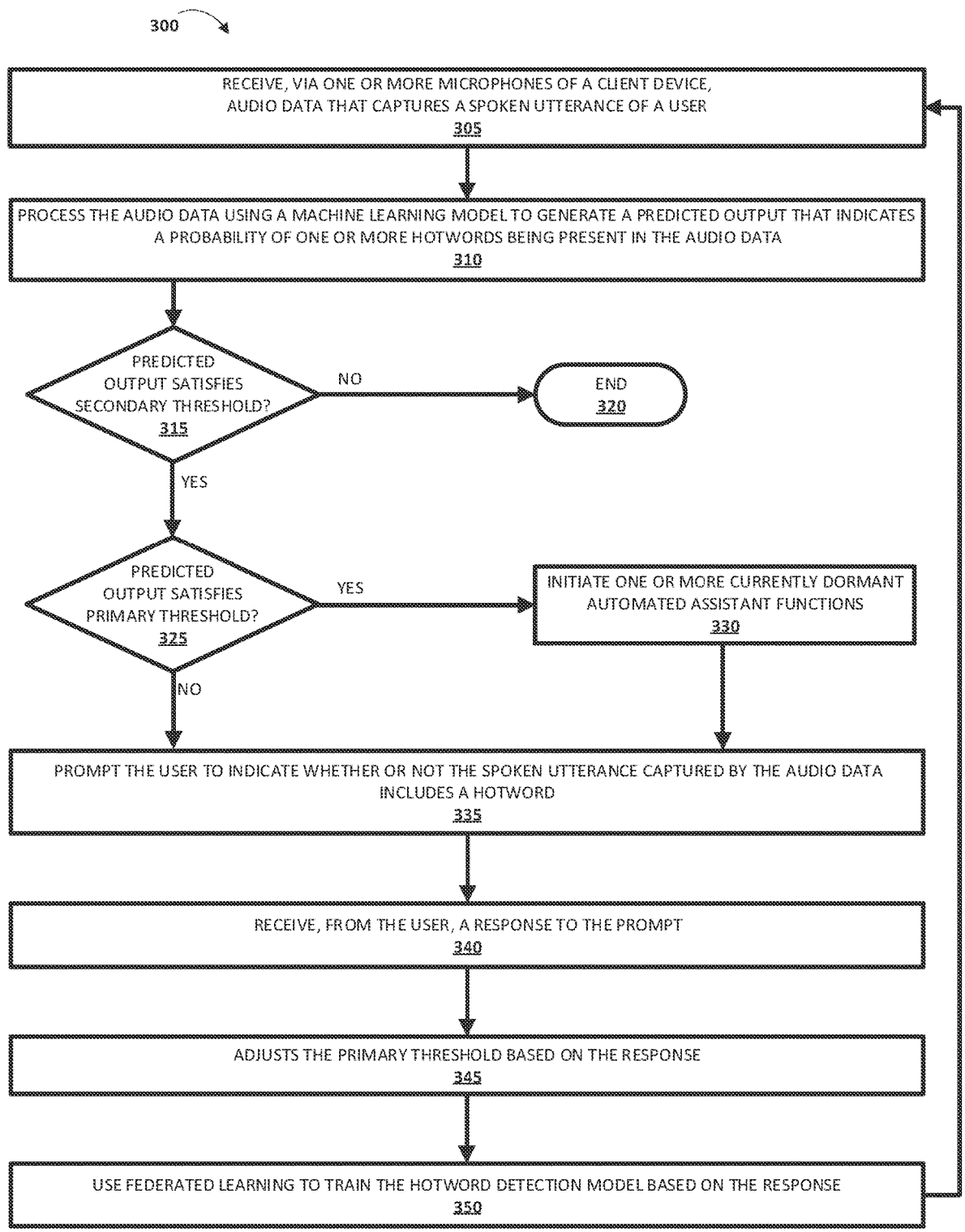
FIG. 3 depicts a flowchart illustrating an example method of adjusting a threshold and generating a gradient, locally at a client device, based on a false negative or a false positive, and transmitting the gradient to a remote server and/or utilizing the generated gradient to update weight(s) of an on-device speech recognition model, in accordance with various implementations.

FIG. 3 depicts a flowchart illustrating an example method 300 of adjusting a threshold and generating a gradient, locally at a client device, based on a false negative or a false positive, and transmitting the gradient to a remote server and/or utilizing the generated gradient to update weight(s) of an on-device speech recognition model. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 305, the system receives, via one or more microphones of a client device, audio data that captures a spoken utterance of a user.

At block 310, the system processes the audio data received at block 305 using a machine learning model to generate a predicted output that indicates a probability of one or more hotwords being present in the audio data. The machine learning model can be, for example, an on-device hotword detection model and/or other machine learning models. Further, the generated output can be, for example, a probability and/or other likelihood measures.

At block 315, the system determines whether or not the predicted output generated at block 310 satisfies a secondary threshold that is less indicative of the one or more hotwords being present in the audio data than is a primary threshold. If, at an iteration of block 315, the system determines that the predicted output generated at block 310 does not satisfy the secondary threshold, then the system proceeds to block 320, and the flow ends. On the other hand, if, at an iteration of block 315, the system determines that the predicted output generated at block 310 satisfies the secondary threshold, then the system proceeds to block 325.

Still referring to block 315, in an example, assume the predicted output, generated at block 310, is a probability and the probability must be greater than 0.65 to satisfy the secondary threshold at block 315, and the predicted probability is 0.88. Based on the predicted probability of 0.88 satisfying the secondary threshold of 0.65, the system proceeds to block 325.

At block 325, the system determines whether or not the predicted output generated at block 310 satisfies the primary threshold. If, at an iteration of block 325, the system determines that the predicted output generated at block 310 does not satisfy the primary threshold, then the system proceeds to block 335. On the other hand, if, at an iteration of block 325, the system determines that the predicted output generated at block 310 satisfies the primary threshold, then the system proceeds to block 330 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, and/or transmission of the recognized text to the remote server.

Still referring to block 330, in an example, assume the predicted output, generated at block 310, is a probability and the probability must be greater than 0.85 to satisfy the primary threshold at block 325 and activate one or more currently dormant automated assistant functions at block 330, and the predicted probability is 0.88. Based on the predicted probability of 0.88 satisfying the threshold of 0.85, the system proceeds to block 330 and initiates the one or more currently dormant automated assistant functions as the user intended.

At block 335, the system prompts the user to indicate whether or not the spoken utterance captured by the audio data received at block 305 includes a hotword. In implementations, the prompt can be in the form of an audio prompt (e.g., rendered utilizing a text-to-speech module) asking whether or not the user uttered a hotword. In other implementations, the prompt may be rendered on a display as a message asking whether or not the user uttered a hotword. In still other implementations, one or more of the prompts may be presented in an application or website associated with the automated assistant client 240 (e.g., an app running on a mobile device). The system may prompt the user at block 335 in close temporal proximity to the utterance (e.g., immediately after performing the actions of blocks 305, 310, 315, and 325) or at a later point in time (e.g., the system may present a plurality of prompts associated with a plurality of utterances at a predetermined daily or weekly time).

Still referring to block 335, in implementations, the prompting may be performed further in response to determining that a number of times that the user has been previously prompted does not exceed a rate limit. In the case where the rate limit has been exceeded, the system may avoid performing the prompting and proceed back to block 305, without performing blocks 340 through 350.

Still referring to block 335, in implementations, the prompting may be performed further in response to determining that a do not disturb state is disabled. In the case where the do not disturb state is enabled, the system may avoid performing the prompting and proceed back to block 305, without performing blocks 340 through 350.

Still referring to block 335, in implementations, the prompting may be performed further in response to determining that the user has not accessed the client device during a predetermined period of time. In the case where the user has accessed the client device during the predetermined period of time, the system may avoid performing the prompting and proceed back to block 305, without performing blocks 340 through 350.

At block 340, the system receives, from the user, a response to the prompt from block 335. In implementations, the response may be an indication from the user as to whether or not the spoken utterance captured by the audio data received at block 305 includes a hotword. In implementations, the response may be in the form of audio data received via one or more microphones of the client device, touchscreen input received via a touchscreen of the client device, and/or input received from a keyboard, a pointing device such as a mouse, trackball, touchpad, or graphics tablet, and/or other types of input devices.

Still referring to block 340, in implementations, the system may log a triggering event on receiving the response from the user at block 340. Additionally, in implementations, the system may log the response received from the user at block 340, which may also be a non-response (i.e., a lack of a response).

At block 345, the system adjusts the primary threshold based on the response received at block 340. In implementations, in the case of a false negative where the predicted output fails to satisfy the primary threshold at block 325 and the response at block 340 indicates that the spoken utterance includes the hotword, the adjusting the primary threshold based on the response includes lowering the primary threshold. In implementations, in the case of a false positive where the predicted output satisfies the primary threshold at block 325 and the response at block 340 indicates that the spoken utterance does not include the hotword, the adjusting the primary threshold based on the response includes raising the primary threshold.

Still referring to block 345, in a non-limiting example of a false negative, assume the predicted output, generated at block 310, is a probability and the probability must be greater than 0.65 to satisfy the secondary threshold at block 315 and greater than 0.85 to satisfy the primary threshold at block 325 and activate one or more currently dormant automated assistant functions at block 330, and the predicted probability is 0.80. Based on the predicted probability of 0.80, the secondary threshold is satisfied at block 315 but the primary threshold is not satisfied at block 325 and therefore the one or more currently dormant automated assistant functions are not activated. In response to receiving a response at block 340 indicating that the spoken utterance captured in the audio data received at block 305 includes a hotword, the primary threshold is lowered at block 345 based on the probability that was generated as the predicted output at block 310 (e.g., 0.80). In another non-limiting example, the primary threshold is lowered at block 345 by a predetermined amount (e.g., 0.85−0.03=0.82) or a predetermined percentage (e.g., 0.85 lowered by 5%=0.8075).

Still referring to block 345, in a non-limiting example of a false positive, assume the predicted output, generated at block 310, is a probability and the probability must be greater than 0.65 to satisfy the secondary threshold at block 315 and greater than 0.85 to satisfy the primary threshold at block 325 and activate one or more currently dormant automated assistant functions at block 330, and the predicted probability is 0.90. Based on the predicted probability of 0.90, the secondary threshold is satisfied at block 315 and the primary threshold is satisfied at block 325 and therefore the one or more currently dormant automated assistant functions are activated. In response to receiving a response at block 340 indicating that the spoken utterance captured in the audio data received at block 305 does not include a hotword, the primary threshold is raised at block 345 based on the probability that was generated as the predicted output at block 310 (e.g., 0.90). In another non-limiting example, the primary threshold is raised at block 345 by a predetermined amount (e.g., 0.85+0.03=0.88) or a predetermined percentage (e.g., 0.85 raised by 5%=0.8925).

At block 350, the system uses federated learning to train the hotword detection model based on the response received at block 340. In implementations, the system generates a gradient based on comparing the predicted output generated at block 310 to ground truth output. In some implementations, the ground truth output is generated based on the response received at block 340 indicating a correction of the decision made at block 325. For example, for a false negative, if the generated predicted output is 0.80 and the threshold is 0.85, then the system can generate the ground truth output of 1.0. In such an example, generating the gradient is based on comparing the predicted output of 0.80 to the ground truth output of 1.0.

Still referring to block 350, the system updates one or more weights of the on-device machine learning model based on the generated gradient and/or the system transmits (e.g., via the Internet or other wide area network) the generated gradient to a remote system (without transmitting any of the audio data, the sensor data, and/or the response received at block 340). When the gradient is transmitted to the remote system, the remote system utilizes the generated gradient, and additional gradients from additional client devices, to update global weights of a global speech recognition model. After block 350, the system then proceeds back to block 305.

Figure 4:
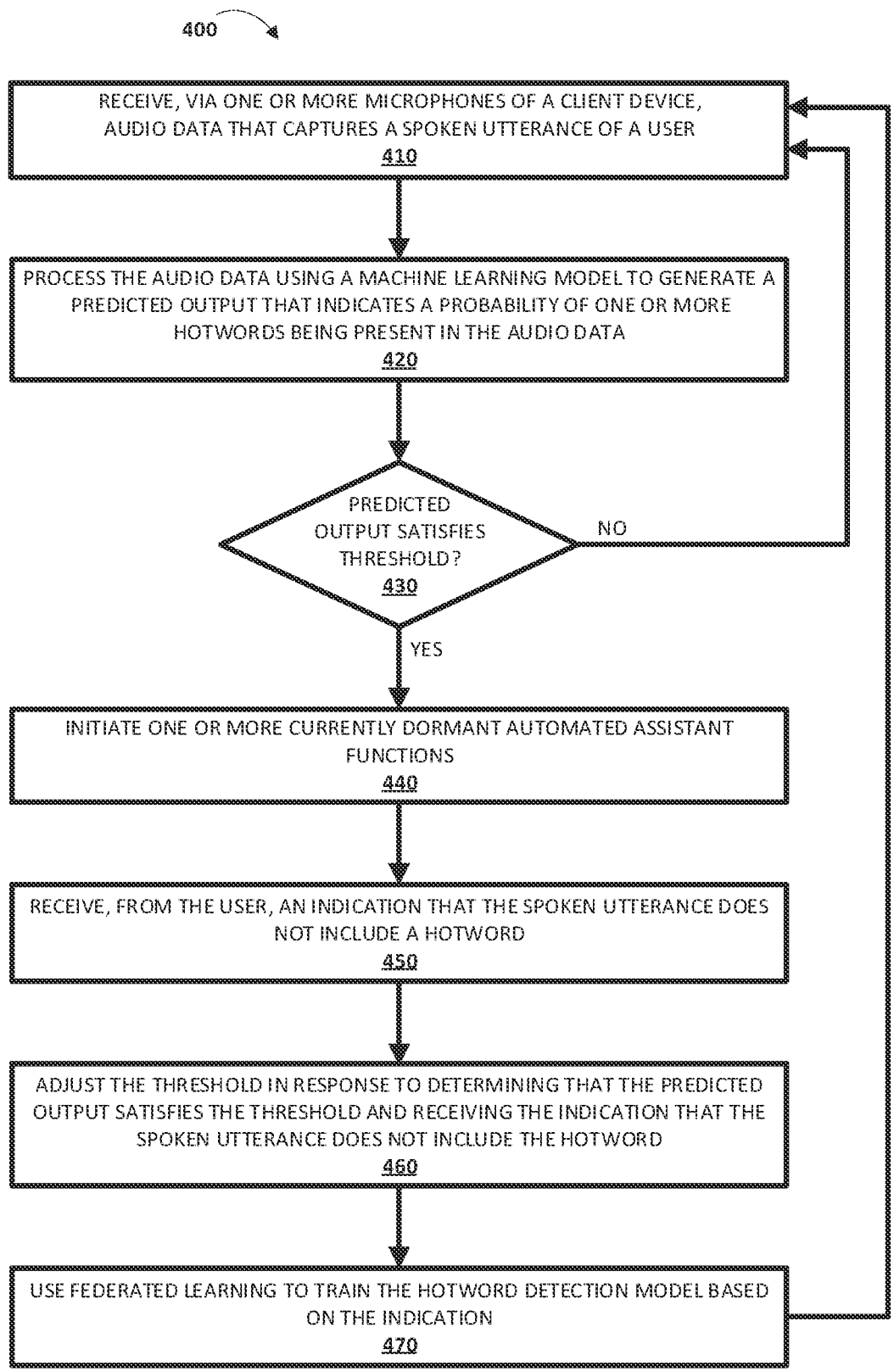
FIG. 4 depicts a flowchart illustrating an example method of adjusting a threshold and generating a gradient, locally at a client device, based on a false positive, and transmitting the gradient to a remote server and/or utilizing the generated gradient to update weight(s) of an on-device speech recognition model, in accordance with various implementations.

FIG. 4 depicts a flowchart illustrating an example method 400 of adjusting a threshold and generating a gradient, locally at a client device, based on a false positive, and transmitting the gradient to a remote server and/or utilizing the generated gradient to update weight(s) of an on-device speech recognition model. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 410, the system receives, via one or more microphones of a client device, audio data that captures a spoken utterance of a user.

At block 420, the system processes the audio data received at block 410 using a machine learning model to generate a predicted output that indicates a probability of one or more hotwords being present in the audio data. The machine learning model can be, for example, an on-device hotword detection model and/or other machine learning models. Further, the generated output can be, for example, a probability and/or other likelihood measures.

At block 430, the system determines whether or not the predicted output generated at block 420 satisfies a threshold. If, at an iteration of block 430, the system determines that the predicted output generated at block 420 does not satisfy the threshold, then the system proceeds back to block 410. On the other hand, if, at an iteration of block 430, the system determines that the predicted output generated at block 420 satisfies the threshold, then the system proceeds to block 440 and initiates one or more currently dormant automated assistant functions.

Still referring to block 430, in an example, assume the predicted output, generated at block 420, is a probability and the probability must be greater than 0.85 to satisfy the threshold at block 430, and the predicted probability is 0.88. Based on the predicted probability of 0.88 satisfying the threshold of 0.85, the system proceeds to block 440 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, and/or transmission of the recognized text to the remote server.

At block 450, the system receives, from the user, an indication that the spoken utterance captured in the audio data received at block 410 does not include a hotword. In implementations, the indication received by the system may be in the form of audio data received via one or more microphones of the client device, touchscreen input received via a touchscreen of the client device, and/or input received from a keyboard, a pointing device such as a mouse, trackball, touchpad, or graphics tablet, and/or other types of input devices.

Still referring to block 450, in implementations, the system may prompt the user to indicate whether or not the spoken utterance captured in the audio data received at block 410 includes the hotword, and the indication that the spoken utterance does not include the hotword is received at block 450 as a response to the prompting. In implementations, the prompt can be in the form of an audio prompt (e.g., rendered utilizing a text-to-speech module) asking whether or not the user uttered a hotword. In other implementations, the prompt may be rendered on a display as a message asking whether or not the user uttered a hotword. In still other implementations, one or more of the prompts may be presented in an application or website associated with the automated assistant client 240 (e.g., an app running on a mobile device). The system may prompt the user at block 450 in close temporal proximity to the utterance (e.g., immediately after performing the actions of blocks 410, 420, 430, and 440) or at a later point in time (e.g., the system may present a plurality of prompts associated with a plurality of utterances at a predetermined daily or weekly time).

Still referring to block 450, in implementations, the prompting may be performed further in response to determining that a number of times that the user has been previously prompted does not exceed a rate limit. In the case where the rate limit has been exceeded, the system may avoid performing the prompting and proceed back to block 410, without performing blocks 460 and 470.

Still referring to block 450, in implementations, the prompting may be performed further in response to determining that a do not disturb state is disabled. In the case where the do not disturb state is enabled, the system may avoid performing the prompting and proceed back to block 410, without performing blocks 460 and 470.

Still referring to block 450, in implementations, the prompting may be performed further in response to determining that the user has not accessed the client device during a predetermined period of time. In the case where the user has accessed the client device during the predetermined period of time, the system may avoid performing the prompting and proceed back to block 410, without performing blocks 460 and 470.

Still referring to block 450, in other implementations, the indication that the spoken utterance captured in the audio data received at block 410 does not include a hotword is additional audio data that captures a subsequent spoken utterance including "No", "Stop", "Cancel", and/or another spoken utterance that contradicts the initial decision made at block 430. In implementations, the initial decision made at block 430 can be classified as incorrect (i.e., a false positive) based on, for example, determining a time duration between the spoken utterance and the additional spoken utterance satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 430 as described herein, and/or other determinations, which are the indication that the spoken utterance captured in the audio data received at block 410 does not include a hotword. In another instance, assume that the further user interface input is alternate input cancelling invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit input cancelling invocation of the assistant, the initial decision made at block 430 can be classified as incorrect (i.e., a false positive) based on, for example, determining a time duration between the spoken utterance and the alternate input cancelling invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 430 as described herein, and/or other determinations, which are the indication that the spoken utterance captured in the audio data received at block 410 does not include a hotword. Accordingly, in these instances, the system can refrain from initiating currently dormant automated assistant function(s) and/or shut down currently active automated assistant function(s) based on determining the initial decision made at block 430 was incorrect.

At block 460, in response to determining that the predicted output satisfies the threshold at block 430 and receiving the indication that the spoken utterance does not include the hotword at block 450, the system adjusts the threshold. In implementations, in the case of a false positive where the predicted output satisfies the threshold at block 430 and the indication received at block 450 indicates that the spoken utterance does not include the hotword, the adjusting the primary threshold based on the response includes raising the primary threshold.

Still referring to block 460, in a non-limiting example of a false positive, assume the predicted output, generated at block 420, is a probability and the probability must be greater than 0.85 to satisfy the threshold at block 430 and activate one or more currently dormant automated assistant functions at block 440, and the predicted probability is 0.88. Based on the predicted probability of 0.88, the threshold is satisfied at block 430 therefore the one or more currently dormant automated assistant functions are activated. In response to receiving an indication block 450 that the spoken utterance does not include the hotword, the threshold is raised at block 460 based on the probability that was generated as the predicted output at block 420 (e.g., 0.88). In another non-limiting example, the threshold is raised at block 460 by a predetermined amount (e.g., 0.85+0.03=0.88) or a predetermined percentage (e.g., 0.85 raised by 5%=0.8925).

At block 470, the system uses federated learning to train the hotword detection model based on the indication received at block 450. In implementations, the system generates a gradient based on comparing the predicted output generated at block 420 to ground truth output. In some implementations, the ground truth output is generated based on the indication received at block 450 indicating a correction of the decision made at block 430. For example, for a false positive, if the generated predicted output is 0.88 and the threshold is 0.85, then the system can generate the ground truth output of 0.0. In such an example, generating the gradient is based on comparing the predicted output of 0.88 to the ground truth output of 0.0.

Still referring to block 470, the system updates one or more weights of the on-device machine learning model based on the generated gradient and/or the system transmits (e.g., via the Internet or other wide area network) the generated gradient to a remote system (without transmitting any of the audio data, the sensor data, and/or the indication received at block 450). When the gradient is transmitted to the remote system, the remote system utilizes the generated gradient, and additional gradients from additional client devices, to update global weights of a global speech recognition model. After block 470, the system then proceeds back to block 410.

Figure 5:
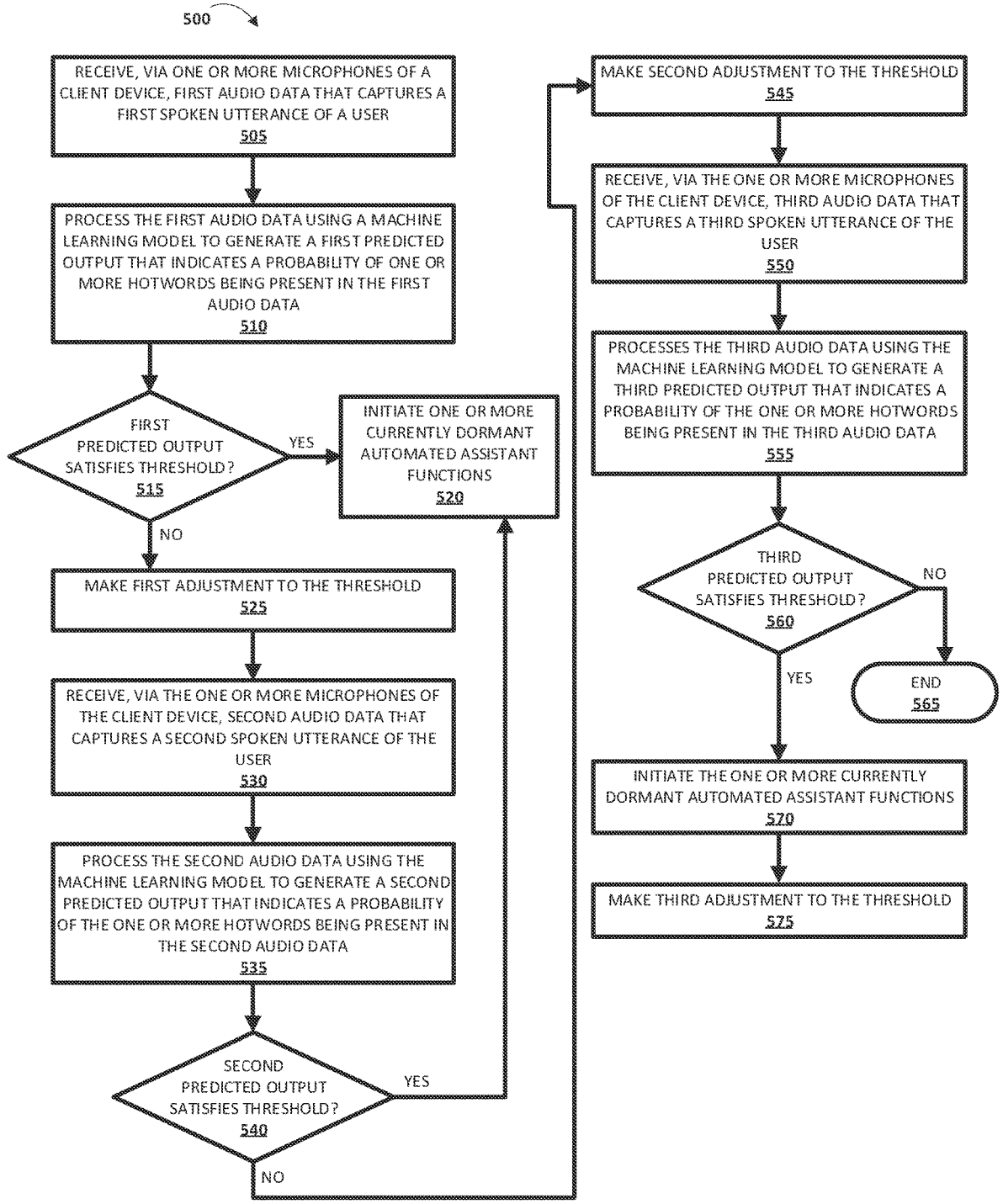
FIG. 5 depicts a flowchart illustrating an example method of adjusting a threshold, based on a false negative, in accordance with various implementations.

FIG. 5 depicts a flowchart illustrating an example method 500 of adjusting a threshold, based on a false negative. For convenience, the operations of the method 500 are described with reference to a system that performs the operations. This system of method 500 includes one or more processors and/or other component(s) of a client device. Moreover, while operations of the method 500 are shown in a particular order, this is not meant to be limiting. One or more operations may be reordered, omitted, or added.

At block 505, the system receives, via one or more microphones of a client device, first audio data that captures a first spoken utterance of a user.

At block 510, the system processes the first audio data received at block 505 using a machine learning model to generate a first predicted output that indicates a probability of one or more hotwords being present in the first audio data. The machine learning model can be, for example, an on-device hotword detection model and/or other machine learning models. Further, the generated output can be, for example, a probability and/or other likelihood measures.

At block 515, the system determines whether or not the first predicted output generated at block 510 satisfies a threshold. If, at an iteration of block 515, the system determines that the first predicted output generated at block 510 satisfies the threshold, then the system proceeds to block 520. On the other hand, if, at an iteration of block 515, the system determines that the first predicted output generated at block 510 does not satisfy the threshold, then the system proceeds to block 525.

At block 520, the system initiates the one or more currently dormant automated assistant functions as the user intended.

At block 525, in response to determining that the first predicted output does not satisfy the threshold at block 515, the system makes a first adjustment to the threshold. In implementations, the making the first adjustment to the threshold includes lowering the threshold (e.g., as described with respect to block 315 of FIG. 3) and is further in response to receiving, from the user, an indication that the first spoken utterance captured in the first audio data received at block 505 includes a hotword.

At block 530, subsequent to making the first adjustment at block 525, the system receives, via the one or more microphones of the client device, second audio data that captures a second spoken utterance of the user.

At block 535, the system processes the second audio data received at block 530 using the machine learning model to generate a second predicted output that indicates a probability of the one or more hotwords being present in the second audio data.

At block 540, the system determines whether or not the second predicted output generated at block 535 satisfies the threshold that is adjusted according to the first adjustment at block 525. If, at an iteration of block 540, the system determines that the second predicted output generated at block 535 satisfies the threshold that is adjusted according to the first adjustment at block 525, then the system proceeds back to block 520. On the other hand, if, at an iteration of block 540, the system determines that the second predicted output generated at block 535 does not satisfy the threshold that is adjusted according to the first adjustment at block 525, then the system proceeds to block 545.

At block 545, in response to determining at block 540 that the second predicted output does not satisfy the threshold that is adjusted according to the first adjustment at block 525, the system makes a second adjustment to the threshold. In implementations, the making the second adjustment to the threshold includes further lowering the threshold (e.g., as described with respect to block 315 of FIG. 3) and is further in response to receiving, from the user, an indication that the second spoken utterance captured in the second audio data received at block 530 includes a hotword.

At block 550, subsequent to making the second adjustment at block 545, the system receives, via the one or more microphones of the client device, third audio data that captures a third spoken utterance of the user.

At block 555, the system processes the third audio data received at block 550 using the machine learning model to generate a third predicted output that indicates a probability of the one or more hotwords being present in the third audio data.

At block 560, the system determines whether or not the third predicted output generated at block 555 satisfies the threshold that is adjusted according to the first adjustment at block 525 and the second adjustment at block 545. If, at an iteration of block 560, the system determines that the third predicted output generated at block 555 does not satisfy the threshold that is adjusted according to the first adjustment at block 525 and the second adjustment at block 545, then the system proceeds to block 565, and the flow ends. On the other hand, if, at an iteration of block 560, the system determines that the third predicted output generated at block 555 satisfies the threshold that is adjusted according to the first adjustment at block 525 and the second adjustment at block 545, then the system proceeds to block 570.

At block 570, the system initiates the one or more currently dormant automated assistant functions as the user intended.

At block 575, in response to determining at block 560 that the third predicted output satisfies the threshold that is adjusted according to the first adjustment at block 525 and the second adjustment at block 545, the system makes a third adjustment to the threshold. In implementations, the making the third adjustment to the threshold includes raising the threshold (e.g., as described with respect to block 315 of FIG. 3) and is further in response to receiving, from the user, an indication that the third spoken utterance captured in the third audio data received at block 550 does not include the hotword. In implementations, in response to receiving the indication that the third spoken utterance does not include the hotword, the system may shut down any currently active automated assistant function(s).

It is noted that, in various implementations of methods 300, 400, and 500, the audio data, the predicted output, the response to the prompting, the further user interface input, the threshold(s), and/or the ground truth output can be stored locally on the client device. Further, in some versions of those implementations of methods 300, 400, and 500, generating the gradient, updating the one or more weights of the on-device machine learning model, and/or transmitting the gradient to the remote system are performed responsive to determining that a current state of the client device satisfies one or more conditions. For example, the one or more conditions include the client device is charging, the client device has at least a threshold state of charge, and/or the client device is not being carried by a user. Moreover, in some additional or alternative versions of those implementations of methods 300, 400, and 500, generating the gradient, updating the one or more weights of the on-device machine learning model, and/or transmitting the gradient to the remote system are performed in real-time. In these and other manners, the threshold and the on-device machine learning model can be adapted quickly to mitigate the occurrence of false negatives and/or false positives. Further, this enables improved performance of the on-device machine learning model for attribute(s) of user(s) of the client device, such as tone, intonation, accent, and/or other speech characteristic(s) in the case of on-device machine learning model(s) that process audio data capturing spoken utterances.

Figure 6:
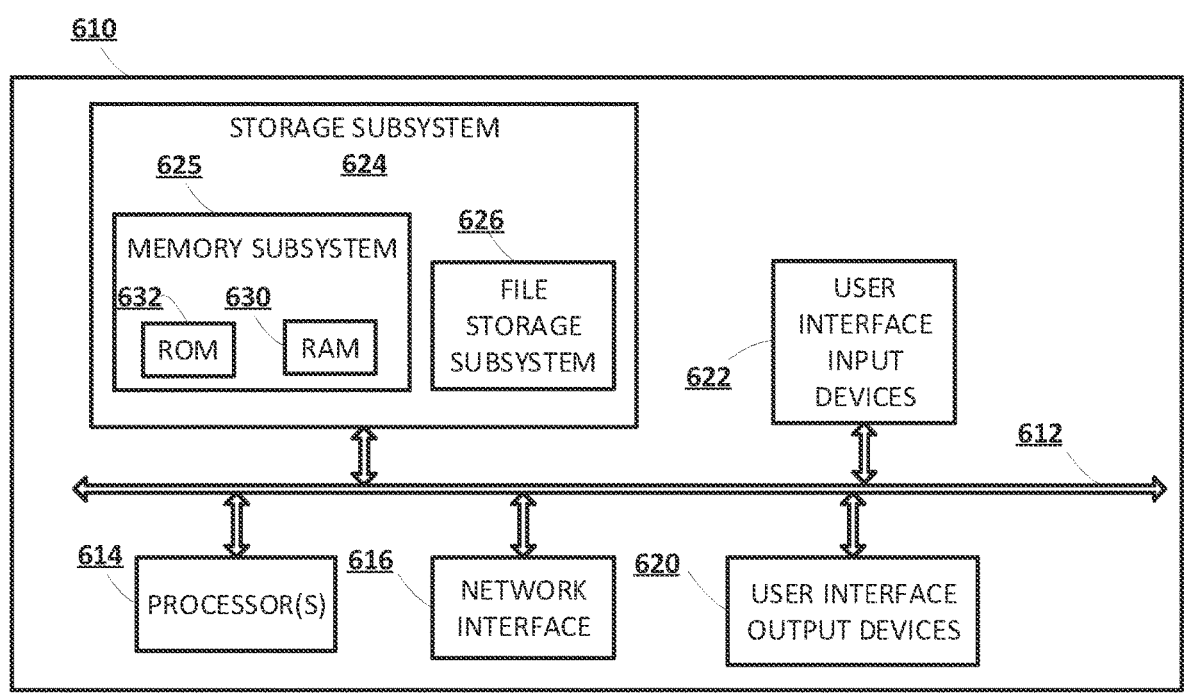
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A and 1B.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
  receiving, via one or more microphones of a client device, audio data that captures a spoken utterance of a user;
  processing the audio data using a machine learning model to generate a predicted output;
  determining that the predicted output satisfies a threshold;
  in response to determining that the predicted output satisfies the threshold, initiating an automated assistant function;
  determining, based on user interface input received subsequent to initiating the automated assistant function, that the automated assistant function should not have been initiated; and in response to determining that the predicted output satisfies the threshold and determining that the automated assistant function should not have been initiated, adjusting the threshold.

2. The method according to claim 1, wherein the machine learning model is a hotword detection model, and
further comprising training the hotword detection model based on determining that the automated assistant function should not have been initiated.

3. The method according to claim 1, wherein the adjusting the threshold comprises raising the threshold.

4. The method according to claim 1, further comprising prompting the user to indicate whether or not the spoken utterance includes the hotword,
wherein the user interface input received subsequent to initiating the automated assistant function is received as a response to the prompting.

5. The method according to claim 4, wherein the prompting is in response to determining that a number of times that the user has been previously prompted does not exceed a rate limit.

6. The method according to claim 4, wherein the prompting is in response to determining that a do not disturb state is disabled.

7. The method according to claim 4, wherein the prompting is further in response to determining that the user has not accessed the client device during a predetermined period of time.

8. A computer program product comprising one or more non-transitory computer-readable storage media having program instructions collectively stored on the one or more non-transitory computer-readable storage media, the program instructions executable to:
receive, via one or more microphones of a client device, audio data that captures a spoken utterance of a user;
process the audio data using a machine learning model to generate a predicted output;
determine that the predicted output satisfies a threshold;
in response to determining that the predicted output satisfies the threshold, initiate an automated assistant function;
determine, based on user interface input received subsequent to initiating the automated assistant function, that the automated assistant function should not have been initiated; and
in response to determining that the predicted output satisfies the threshold and determining that the automated assistant function should not have been initiated, adjust the threshold.

9. The computer program product according to claim 8, wherein:
the machine learning model is a hotword detection model; and
the program instructions are further executable to train the hotword detection model based on determining that the automated assistant function should not have been initiated.

10. The computer program product according to claim 8, wherein the adjusting the threshold comprises raising the threshold.

11. The computer program product according to claim 8, wherein:
the program instructions are further executable to prompt the user to indicate whether or not the spoken utterance includes the hotword; and
the user interface input received subsequent to initiating the automated assistant function is received as a response to the prompting.

12. The computer program product according to claim 11, wherein the prompting is in response to determining that a number of times that the user has been previously prompted does not exceed a rate limit.

13. The computer program product according to claim 11, wherein the prompting is in response to determining that a do not disturb state is disabled.

14. The computer program product according to claim 11, wherein the prompting is further in response to determining that the user has not accessed the client device during a predetermined period of time.

15. A system comprising:
a processor, a computer-readable memory, one or more non-transitory computer-readable storage media, and program instructions collectively stored on the one or more non-transitory computer-readable storage media, the program instructions executable to:
receive, via one or more microphones of a client device, audio data that captures a spoken utterance of a user;
process the audio data using a machine learning model to generate a predicted output;
determine that the predicted output satisfies a threshold;
in response to determining that the predicted output satisfies the threshold, initiate an automated assistant function;
determine, based on user interface input received subsequent to initiating the automated assistant function, that the automated assistant function should not have been initiated; and
in response to determining that the predicted output satisfies the threshold and determining that the automated assistant function should not have been initiated, adjust the threshold.

16. The system according to claim 15, wherein:
the machine learning model is a hotword detection model; and
the program instructions are further executable to train the hotword detection model based on determining that the automated assistant function should not have been initiated.

17. The system according to claim 15, wherein the adjusting the threshold comprises raising the threshold.

18. The system according to claim 15, wherein:
the program instructions are further executable to prompt the user to indicate whether or not the spoken utterance includes the hotword; and
the user interface input received subsequent to initiating the automated assistant function is received as a response to the prompting.

19. The system according to claim 18, wherein the prompting is in response to determining that a number of times that the user has been previously prompted does not exceed a rate limit.

20. The system according to claim 18, wherein the prompting is in response to determining that a do not disturb state is disabled.

* * * * *